US007182229B2

(12) United States Patent
Gould et al.

(10) Patent No.: US 7,182,229 B2
(45) Date of Patent: Feb. 27, 2007

(54) DEVICE FOR DISPENSING LIQUID HAVING AN IMPROVED SEAL ASSEMBLY

(75) Inventors: Mark A Gould, Gainesville, GA (US); John M Riney, Buford, GA (US)

(73) Assignee: Nordson Corporation, Westlake, OH (US)

( * ) Notice: Subject to any disclaimer, the term of this patent is extended or adjusted under 35 U.S.C. 154(b) by 295 days.

(21) Appl. No.: 10/905,250

(22) Filed: Dec. 22, 2004

(65) Prior Publication Data

US 2006/0131348 A1 Jun. 22, 2006

(51) Int. Cl.
*G01F 11/00* (2006.01)

(52) U.S. Cl. ........................ 222/389; 222/504; 222/518

(58) Field of Classification Search ................ 222/389, 222/504, 518, 542
See application file for complete search history.

(56) References Cited

U.S. PATENT DOCUMENTS 5,277,344 A * 1/1994 Jenkins ........................ 222/504
6,056,155 A 5/2000 Byerly et al. .................. 222/1
6,089,413 A 7/2000 Riney et al. ................ 222/318
6,161,722 A * 12/2000 Sooudi et al. ................. 222/1
6,761,290 B2 7/2004 Righolt et al. .............. 222/504
6,799,702 B1 * 10/2004 Mercer et al. ......... 222/189.06
6,811,059 B2 * 11/2004 Piucci et al. ................ 222/148
2003/0080153 A1 5/2003 Saidman et al.
2003/0205589 A1 11/2003 Righolt et al.
2004/0011817 A1 1/2004 Colangelo et al.
2004/0076551 A1 4/2004 Saidman et al.
2004/0195278 A1 * 10/2004 Leeuw ....................... 222/504

OTHER PUBLICATIONS

Nordson Corporation, *UM22 Series Universal™ Modules*, Brochure, 2004, 2 pgs.
Nordson Corporation, *UM25 Series Universal™ Modules*, Brochure, 2004, 2 pgs.

* cited by examiner

*Primary Examiner*—Joseph A. Kaufman
(74) *Attorney, Agent, or Firm*—Wood, Herron & Evans, L.L.P.

(57) ABSTRACT

A device for dispensing a liquid includes a dispenser body having a liquid passage and an air passage. A valve stem is mounted in the dispenser body and reciprocates between an open position allowing liquid flow and a closed position preventing liquid flow. A pre-assembled unitary seal assembly is threadably engaged with the dispenser body and includes a housing having a bore therethrough. The housing includes a first and second seal members positioned within the bore that each form a dynamic seal with the valve stem to prevent air and liquid from leaking out of the air and liquid passages. The housing further includes a static seal between the outside of the housing and the dispenser body. The valve stem may be moved to an open position by pressurized air acting on a piston and moved to the closed position by a spring-return mechanism to selectively dispense the liquid.

10 Claims, 3 Drawing Sheets

DEVICE FOR DISPENSING LIQUID HAVING AN IMPROVED SEAL ASSEMBLY

FIELD OF THE INVENTION

This invention generally relates to liquid dispensing devices for dispensing a heated liquid and, more particularly, to a device for dispensing a heated liquid having an improved seal assembly.

BACKGROUND OF THE INVENTION

A typical dispensing device for supplying a liquid, such as hot melt adhesive, generally includes a dispenser body having a valve stem that opens and closes a dispensing orifice. The valve stem is usually operated by pressurized air to dispense discrete amounts of pressurized liquid. One or more liquid seals within the device prevent the migration of liquid between the liquid and air passages of the device.

Devices generally related to the present invention include a liquid passage adjacent the dispensing orifice and an air passage or chamber at an opposite end of the device. The air passage contains a piston connected to the valve stem on one side and may include a spring-return mechanism on the other side. Under sufficient air pressure, the piston and valve stem may be moved in a direction away from a valve seat to discharge liquid. When the air pressure on one side of the piston is relieved, the spring-return mechanism will automatically return the valve stem to a normally closed position against the valve seat. Air pressure may also, or alternately, be used to close the valve stem. The spring-return mechanism may be used to adjust the valve stroke such as by varying its compression, thereby varying the amount of air pressure required to open the valve. Adjustment of the spring compression will also adjust the biasing force used to close the valve.

Dispensing devices related to the present invention generally situate at least one dynamic seal between the dispenser body and the valve stem to prevent liquid from leaking out of the liquid passage and into the air passage. Dynamic seals are conventionally understood to be seals between two surfaces that move relative to one another. For example, many dispensing devices use one or more lip seals having a coil spring that supplies a radially-directed inward force to bias an annular lip against the valve element. The annular lip generally includes a bearing edge that provides a wiping action as the valve stem moves relative to the seal. In other dispensing devices, a seal, such as a standard O-ring or spring-energized cup seal, tightly fit around the valve stem for axial movement therewith along an inner surface of the dispenser body. In either case, the relative motion between the valve stem and the dispenser body causes the seal to wear and therefore lose its ability to seal properly.

Consequently, to prevent liquid from migrating into the air passage and causing major damage to the dispensing device, the seals are generally replaced as part of a routine, in-house maintenance program. To perform the maintenance, the production line is temporarily shut down so that the dispensing device may be disassembled and the seals replaced. Shutting down the production line, however, increases costs due to lost production and lost time. Thus, it is desirable to minimize the time it takes to replace the seals. Current dispensing devices, however, have complex seal designs that include many separate, individual parts that must be disassembled in the correct manner, then reassembled in the correct manner. As a result, seal replacement in current dispensing devices can be a tedious and time consuming process that increases production line down time and increases costs.

Accordingly, there is a need for an improved device for dispensing viscous liquids, such as hot melt adhesives, which has an improved seal assembly that can be replaced in a quick and convenient manner thereby reducing down time and overall costs.

SUMMARY OF THE INVENTION

The invention addresses these and other drawbacks associated with prior devices by providing a dispensing device having a dispenser body with a liquid passage and an air passage therein. The liquid passage includes a liquid inlet that receives the liquid and a discharge outlet for dispensing the liquid from the device. The liquid inlet and discharge outlet are in fluid communication with the liquid passage. The air passage includes an air inlet in fluid communication with the air passage for supplying the air passage with pressurized air. A valve stem is mounted within the dispenser body and is adapted to move relative to the dispenser body between an open position allowing liquid flow from the discharge outlet and a closed position preventing liquid flow from the discharge outlet. The device further includes a pre-assembled, unitary seal assembly positioned within the dispenser body between the liquid passage and the air passage to prevent air and liquid from leaking out of their respective passages.

The seal assembly includes a housing having an outer surface with threads removably coupling the housing with the dispenser body. The housing further includes a proximal end, a distal end, and a bore extending from the proximal end to the distal end, the bore receiving a portion of the valve stem therethrough. A first seal member is positioned within a first portion of the bore and forms a dynamic seal with the valve stem, thereby preventing air from leaking out of the air passage. A second seal member is positioned with a second portion of the bore and likewise forms a dynamic seal with the valve stem, thereby preventing liquid from leaking out of the liquid passage. A static seal is located or formed between the housing and the dispenser body. The static seal prevents liquid from leaking out of the liquid passage between the dispenser body and seal assembly housing.

In an exemplary embodiment of the invention, the housing has a generally cylindrical shape and generally includes a proximal portion, an intermediate portion, and a distal portion. The bore within the housing has a stepped configuration generally defining a corresponding proximal bore portion, intermediate bore portion, and distal bore portion. A first shoulder is defined between the proximal and intermediate bore portions that supports the first seal member within the housing. To this end, the diameter of the proximal bore portion is larger than the diameter of the intermediate bore portion thereby defining the first shoulder. The first seal member includes a plurality of disc seals, and preferably four disc seals, having a central aperture receiving the valve stem. The disc seals are inserted into the proximal bore portion so as to engage the first shoulder and are secured therein by a retaining ring that frictionally engages the bore wall. A second shoulder is defined between the intermediate and distal bore portions that supports the second seal member within the housing. To this end, the diameter of the intermediate bore portion is smaller than the diameter of the distal bore portion thereby defining the second shoulder. The second seal member may be a lip seal having a central aperture receiving the valve stem and an edge portion that bears against the valve stem. The lip seal is inserted into the distal bore portion so as to engage the second shoulder. The outside of the housing along the distal portion may include a groove for receiving a third seal member that forms the static seal between the housing and the dispenser body. For example, in the exemplary embodiment, the static seal is formed with an O-ring carried by the housing. However, it may be formed in other manners, such as by extending the threads on the outside of the seal assembly housing, with or without sealing material such as PTFE on the threads, or by other metal-to-metal or metal-to-nonmetal sealing methods.

The device further includes an actuator operatively coupled to the valve stem to actuate the valve stem between the open and closed positions. In the exemplary embodiment, the actuator includes a piston coupled to the valve stem and positioned within the air passage. The pressurized air from the air inlet acts on the piston for pneumatically actuating the valve stem. A spring-return mechanism may be provided for urging the valve stem toward the closed position.

These and other objects, advantages and features of the invention will become more readily apparent to those of ordinary skill in the art upon review of the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
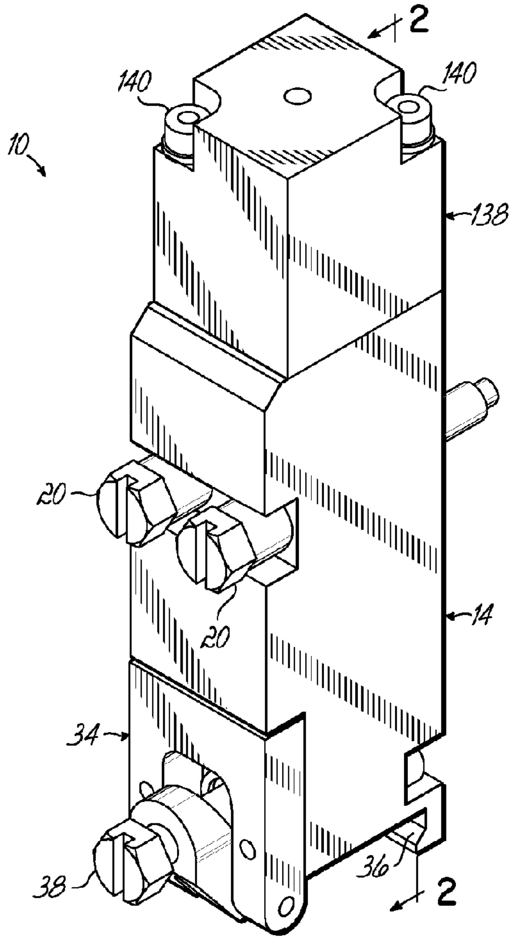
FIG. 1 illustrates an exemplary liquid dispensing device.
Figure 2:
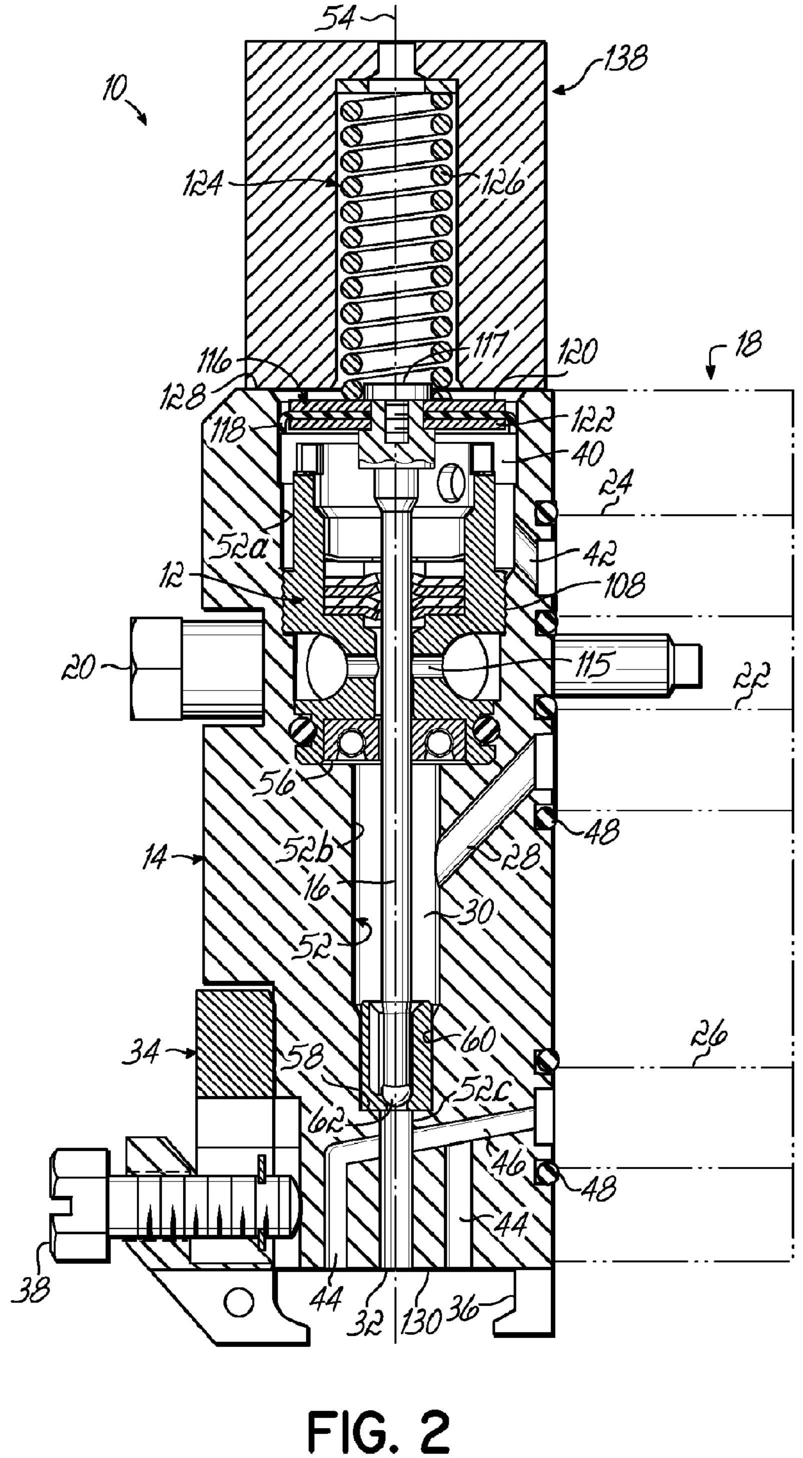
FIG. 2 illustrates a sectional view of the exemplary liquid dispensing device of FIG. 1 generally taken along line 2—2 and having a seal assembly in accordance with the invention.

As shown in FIGS. 1 and 2, a device 10 for dispensing a heated viscous liquid, such as a hot melt adhesive, having a pre-assembled unitary seal assembly 12 in accordance with the invention, generally includes a dispenser body 14 having a valve stem 16 adapted to be actuated for selectively dispensing discrete amounts of liquid. The dispenser body 14 is adapted to be heated and is constructed from a heat-transferable, non-interactive metal, such as aluminum, brass, stainless steel, or the like. The dispenser body 14 further is coupled to a manifold 18, shown in phantom in FIG. 2, by one or more mounting fasteners 20. The manifold 18 generally distributes heated liquid and air to one or more dispensing devices 10 mounted thereto. To this end, manifold 18 includes a liquid outlet port 22 carrying heated liquid, and an air outlet port 24 for supplying pressurized air that actuates valve stem 16. Manifold 18 may also include a second air outlet port 26 for supplying pressurized air that controls the pattern of the liquid dispensed from device 10. The operation of manifold 18 is well understood by one of ordinary skill in this field and delivers heated liquid, actuation air, and pattern air to dispenser body 14 via liquid and air outlet ports 22, 24, and 26, respectively.

The dispenser body 14 includes a lower portion provided with a liquid inlet 28 in fluid communication with the liquid outlet port 22 to receive the heated liquid, a liquid passage 30 in communication with the liquid inlet 28, and a discharge outlet 32 in communication with the liquid passage 30. As is known in the art, a nozzle (not shown) may be coupled to the dispenser body 14 adjacent discharge outlet 32. To this end, dispenser body 14 may include a connecting member 34 having a groove 36 adapted to receive a nozzle and a retaining bolt 38 for securing the nozzle to the dispenser body 14. The dispenser body 14 also includes an upper portion provided with an air passage 40 in communication with an air inlet 42 that receives and directs pressurized air from the air outlet port 24 to the air passage 40. Air passage 40 is used to operate the valve stem 16, as will be discussed in more detail below. Dispenser body 14 may further include a second air passage(s) 44 below liquid passage 30 in communication with air inlet 46 that receives and directs pressurized air from the air outlet port 26 to the air passage(s) 44. Air passage(s) 44 are used to control the pattern of the liquid being dispensed out of discharge outlet 32. O-rings 48 are respectively disposed about inlets 28, 42, 46 to seal these connections. Air and liquid inlets 28, 42, 46 may have an annular lip that interferes slightly with the inner diameter of O-rings 48 for sealing with manifold 18.

In an exemplary embodiment of the invention, dispenser body 14 includes a central passage 52 generally having a first passage portion 52*a*, a second passage portion 52*b*, and a third passage portion 52*c* extending through the dispenser body 14 along a generally longitudinal axis 54. The central passage 52 defines a first shoulder 56 between first passage portion 52*a* and second passage portion 52*b* and a second shoulder 58 between second passage portion 52*b* and third passage portion 52*c*. For instance, the shoulders 56, 58 may be defined by a reduction in the diameter of the central passage 52, as shown in FIG. 2. The air passage 40 is then disposed in central passage 52 above first shoulder 56. Liquid passage 30 is then disposed in central passage 52 between first and second shoulders 56, 58. Air passage(s) 44 may then be disposed about central passage 52 below second shoulder 58. As will be explained in more detail below, the stepped configuration of central passage 52 provides support surfaces for various components of device 10.

With reference to FIG. 2, device 10 includes a valve stem 16 mounted in the central passage 52 of dispenser body 14 and configured for reciprocating movement relative to the dispenser body 14 generally along longitudinal axis 54 between an open and closed position. To this end, dispenser body 14 includes a valve seat 60 situated between the liquid inlet 28 and discharge outlet 32. Valve stem 16 includes a valve element, such as ball 62, that cooperates with valve seat 60 to selectively allow or prevent liquid flow from the discharge outlet 32. In the open position, ball 62 is disengaged from the valve seat 60 so that a gap is formed between the ball 62 and valve seat 60 that allows liquid to be dispensed from dispensing outlet 32. In the closed position, ball 62 is engaged with the valve seat 60 so as to prevent any liquid from being dispensed from the discharge outlet 32. Movement of the valve stem 16 between the open and closed position then controls the dispensing of liquid from the device 10. Valve seat 60 is generally made of a carbide material and is inserted into the central passage 52 so as to engage second shoulder 58. The diameters of central passage 52 adjacent second shoulder 58 and valve seat 60 are sized so that valve seat 60 may be press fit therein to secure valve seat 60 within dispenser body 14. As recognized by those of ordinary skill in the art, other methods may be used to secure valve seat 60 in dispenser body 14.

Figure 3A:
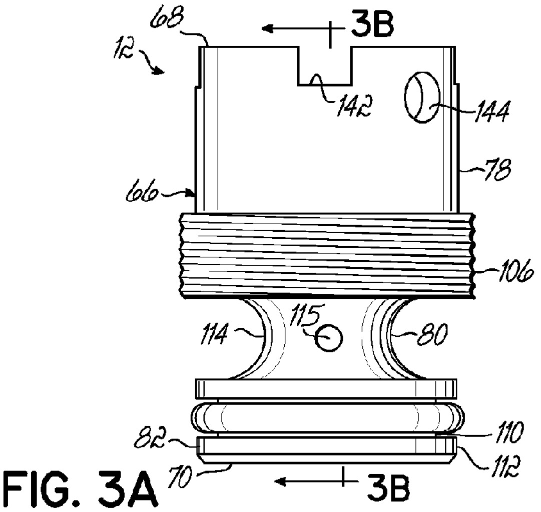
FIG. 3A is an exemplary seal assembly in the device shown in FIG. 2.
Figure 3B:
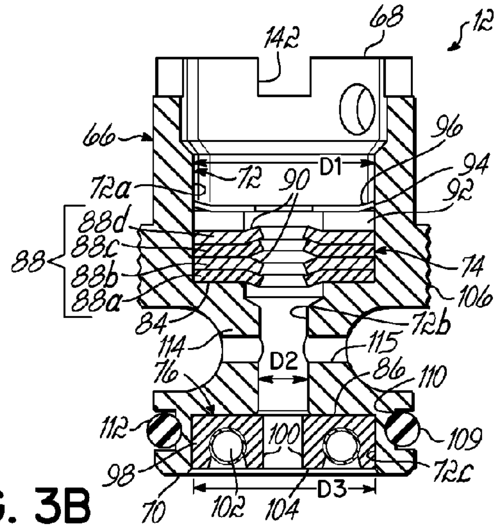
FIG. 3B is a sectional view of the seal assembly of FIG. 3A generally taken along line 3B—3B.

In an advantageous aspect of the invention, a unitary seal assembly 12 is positioned within central passage 52 between the liquid passage 30 and the air passage 40. The seal assembly 12 operates to prevent any air from leaking out of air passage 40 and into liquid passage 30 thereby causing sputtering and inconsistent liquid dispensing. The seal assembly 12 further operates to prevent any liquid from leaking out of the liquid passage 30 and into the air passage 40 thereby binding valve stem 16 or otherwise preventing proper operation of the device 10. Seal assembly 12, through its pre-assembled, unitary construction, advantageously allows for quick and convenient replacement of the dynamic seals within dispenser body 14 so as to reduce production line down time and reducing overall costs. To this end, and as shown in FIGS. 3A and 3B, seal assembly 12 includes a housing 66 having a proximal end 68, a distal end 70, and a bore 72 extending from the proximal end 68 to the distal end 70. Housing 66 may be made from brass, aluminum, stainless steel and other suitable materials. Bore 72 is configured to receive a portion of the valve stem 16 which moves relative to housing 66 between the open and closed positions. The seal assembly 12 includes a first seal member 74 positioned within the bore 72 and secured to housing 66. The first seal member 74 forms a fluid-tight dynamic seal around valve stem 16 during reciprocating movement of valve stem 16 to prevent air from leaking out of the air passage 40, past first seal member 74, and into the liquid passage 30. The seal assembly 12 further includes a second seal member 76 positioned within bore 72 and spaced apart from first seal member 74. The second seal member 76 likewise forms a fluid-tight dynamic seal around valve stem 16 to prevent liquid from leaking out of liquid passage 30, past second seal member 76, and into air passage 40.

In an exemplary embodiment of the seal assembly 12, the housing 66 takes a generally cylindrical shape and includes a proximal portion 78, an intermediate portion 80, and a distal portion 82. Bore 72 has a stepped configuration through housing 66 which defines a proximal bore portion 72*a*, an intermediate bore portion 72*b*, and distal bore portion 72*c*. The bore 72 defines a first shoulder 84 between proximal bore portion 72*a* and intermediate bore portion 72*b* and a second shoulder 86 between intermediate bore portion 72*b* and distal bore portion 72*c*. For instance, the shoulders 84, 86 may be defined by a change in the diameter of the bore 72, as shown in FIG. 3B. To this end, the proximal bore portion 72*a* may have a diameter $D_1$ and the intermediate bore portion 72*b* may have a diameter $D_2$, where $D_2$ is less than $D_1$ to define first shoulder 84 that faces the proximal end 68 of housing 66. In a similar manner, distal bore portion 72*c* may have a diameter $D_3$ that is larger than $D_2$ to define second shoulder 86 that faces the distal end 70 of housing 66. The first seal member 74 is positioned in proximal bore portion 72*a* so as to be supported in the housing 66 by first shoulder 84. The second seal member 76 is positioned in the distal bore portion 72*c* so as to be supported in the housing 66 by second shoulder 86.

In the exemplary embodiment, the first seal member 72 includes a plurality of disc seals 88, and preferably four disc seals 88*a*, 88*b*, 88*c*, 88*d*. The disc seals 88 may be generally flat, thin, disc-shaped seals having an outer diameter and a central aperture adapted to receive a portion of valve stem 16 extending through housing 66. The disc seals 88 may be generally made from PTFE materials, such as TEFLON®, or reinforced PTFE materials, such as RULON®. Disc seals 88 include an inner lip 90 that extends out of the plane of the disc seal 88 in a preferred direction. Lip 90 is configured to receive the portion of the valve stem 16 through housing 66 and seal the valve stem 16 as it moves relative to disc seals 88 between the open and closed positions. The disc seals 88 are positioned so that each disc seal 88 is adjacent another disc seal 88 to form a stacked configuration as shown in FIG. 3B. In the exemplary embodiment, disc seals 88*a*, 88*b* have lip 90 extending toward the distal end 70 and disc seals 88*c*, 88*d* have lip 90 extending toward the proximal end 68. The invention, however, is not so limited as disc seals 88 may be stacked with lip 90 in other configurations.

The outer diameter of the disc seals 88 is configured to be substantially equal to the diameter $D_1$ of the proximal bore portion 72*a*. In this way, disc seals 88 may be snugly fit within and moved along bore 72 until disc seal 88*a* engages first shoulder 84. To secure disc seals 88 within the housing 66, seal assembly 12 further includes a washer 92 overlying the stack of disc seals 88 and adjacent disc seal 88*d*, and a retaining ring 94 adjacent washer 92 so that disc seals 88 are juxtaposed between retaining ring 94 and first shoulder 84. Retaining ring 94 includes a plurality of tabs 96 extending from its periphery and circumferentially spaced thereabout. The retaining ring 94 is sized so that the edges of the tabs 94 frictionally engage the wall of bore 72. The tabs 94 are angled with respect to the plane of the retaining ring 94 so as to extend toward the proximal end 68. This configuration permits the retaining ring 94 to be inserted into bore 72 in proximal portion 78 but prevents, or at least makes difficult, the removal of the retaining ring 94 therefrom. In this way, disc seals 88 can be secured within housing 66 and prevented from moving relative thereto.

Furthermore, in the exemplary embodiment, the second seal member 76 may be a spring-energized lip seal 98. Lip seal 98 has a generally J-shaped cross-section and includes an annular lip 100 bearing against valve stem 16. A coil spring 102 is contained within lip seal 98 for supplying a radially-directed inward force against lip 100 such that an edge 104 thereof bears against valve stem 16. Edge 104 of lip 100, as well as the contact area between lip 100 and valve stem 16, is generally disposed at the diameter of the coil spring 102. This supplies optimum force and wiping action of lip 100 against valve stem 16. Lip seal 98 may be made from a variety of elastomers, such as the fluoroelastomer marketed as Viton®, or other suitable materials including polyetheretherketone (PEEK). Lip seal 98 is inserted into distal bore portion 72*c* from the distal end 70. The outer diameter of lip seal 98 is substantially equal to the diameter $D_3$ of distal bore portion 72*c*. In this way, lip seal 98 may be snugly fit within and moved along bore 72 until lip seal 98 engages second shoulder 86. As will be discussed later, lip seal 98 is retained within housing 66 during reciprocating movement of valve stem 16 by dispenser body 14. As one or ordinary skill in the art will recognize, other types of seals may be used as the first and second seal members 74, 76. Thus, the invention is not limited to the disc seals 88 and lip seal 98 described herein.

Referring back to FIG. 2, the seal assembly 12 is positioned in dispenser body 14 so that the distal end 70 of housing 66 engages first shoulder 56. To secure seal assembly 12 within dispenser body 14, the outer surface of housing 66 includes external threads 106 and central passage 52 includes a corresponding set of internal threads 108, threads 106, 108 cooperating to removably couple seal assembly 12 with dispenser body 14. As shown in FIG. 3, the housing 66 may include a third seal 109 that forms a fluid-tight static seal between the housing 66 and the dispenser body 14 to prevent liquid from leaking out of the liquid passage 30. To this end, the distal portion 82 of housing 66 may include a groove 110 adapted to receive an O-ring 112 so as to create the static seal between the housing 66 and central passage 52 of dispenser body 14. To provide for mounting fasteners 20, that secure device 10 to manifold 18, housing 66 includes a cutout portion, and preferably, an annular, arcuately-shaped recess 114, formed in the outer surface of the intermediate portion 80 of housing 66. The recess 114 accommodates the shape of the mounting fasteners 20 when fasteners 20 are inserted through device 10 to mount device 10 to manifold 18. Additionally, housing 66 may include at least one weep hole 115 between first and second seal members 74, 76. Weep hole 115 is in communication with valve stem 16 and allows escape of any liquid leaking past second seal member 76 before such liquid reaches first seal member 74 and air passage 40.

As shown in FIG. 2, device 10 further includes an actuator operatively coupled to valve stem 16 and capable of actuating the valve stem 16 between the open and closed positions so as to selectively dispense liquid from the discharge outlet 32. In the exemplary embodiment, the actuator includes a piston 116 that includes a glass impregnated PTFE disc seal 118 (sold as RULON® type AR by Furon company) sandwiched between two rigid metal discs 120, 122. Valve stem 16 may include a groove therein for receiving piston 116 and a fastener, such as screw 117, may be used to secure piston 116 to valve stem 16. The piston 116 is positioned within air passage 40 so that a bottom surface of piston 116 closes off the air passage 40 and is sealed by piston seal 118. As indicated above, pressurized air may be introduced into air passage 40 to move piston 116, valve stem 16, and ball 62 away from valve seat 60 and allow liquid flow from the discharge outlet 32.

Device 10 may also include a spring-return mechanism 124 operatively coupled to valve stem 16 and configured to urge piston 116, valve stem 16, and ball 62 downward into engagement with valve seat 60. To this end, when air passage 40 is depressurized, a spring 126 applies a downward force to engage ball 62 with valve seat 60 and prevent liquid flow from discharge outlet 32. Those having ordinary skill in the art will recognize other configurations for the actuator. For instance, instead of a spring return mechanism 124, a double acting piston with air passages on both sides of the piston may be used. Alternately, electrical actuators may be used to selectively move the valve stem 16 between open and closed positions.

In operation, liquid is introduced under pressure into liquid inlet 28 until liquid passage 30 is filled. Sufficient pressurized air is delivered to air passage 40 and acts on piston 116 to overcome the force of spring 126 and move piston 116, valve stem 16, and ball 62 away from the valve seat 60. Pressurized liquid in liquid passage 30 will then flow out of discharge outlet 32. When the pressurized air in air passage 40 is sufficiently reduced, the force from spring 126 urges piston 116, valve stem 16, and ball 60 toward valve seat 60 so that ball 62 engages valve seat 60 thereby closing discharge outlet 32 and preventing any liquid flow therefrom. During reciprocation of valve stem 16, the seal assembly 12, and in particular, the first and second seal members 74, 76 in housing 66 maintain fluid-tight dynamic seals with the valve stem 16, thereby preventing air from leaking out of air passage 40 and further preventing liquid from leaking out of the liquid passage 30.

Figure 4:
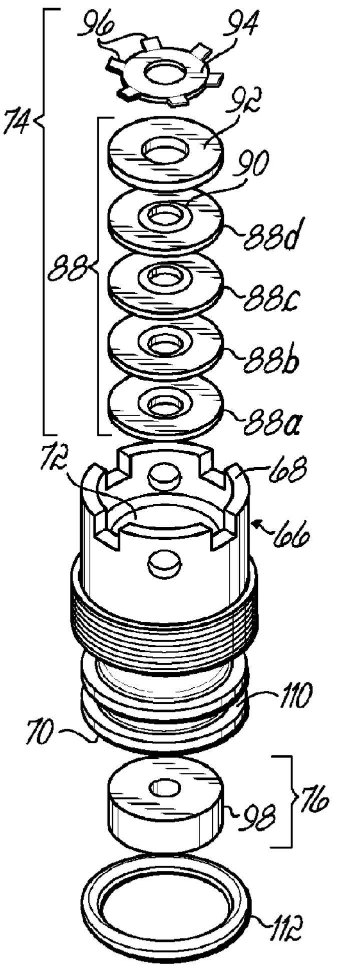
FIG. 4 illustrates an exploded view of the components of the seal assembly of FIG. 3A.

The seal assembly 12 has a unitary structure and may be pre-assembled as shown in FIG. 4. Thus, to assemble the seal assembly 12, the disc seals **88*a*–88*d* are inserted into the proximal end 68 of the housing 66 and moved along proximal bore portion 72*a* until disc seal 88*a* engages first shoulder 84. The washer 92 and retaining ring 94 are then respectively inserted into the proximal end 68 of housing 66 and moved along proximal bore portion 72*a* to secure the disc seals 88 therein. The lip seal 98 is then inserted into the distal end 70 of housing 66 and moved along distal bore portion 72*c* until the lip seal 88 engages second shoulder 86. Additionally, the O-ring 112 is then positioned in groove 110 of distal portion 82. The unitary seal assembly 12 in accordance with the invention is then ready to be inserted into the dispenser body 14**, as will now be described.

To assemble device 10, including seal assembly 12 in accordance with the invention, a dispenser body 14 having a central passage 52 formed therein is provided. The central passage 52 is advantageously formed in the dispenser body 14 by machining from one end, such as the proximal end 128. This is in contrast to many current devices where the central passage is machined from both ends of the dispenser body. Machining the central passage 52 from only one end avoids the potential for misalignment of the various passages and parts within the dispenser body 14. The central passage 52 is formed so that the cross-dimension of passage 52 gets progressively smaller from proximal end 128 to distal end 130. This not only allows central passage 52 to be machined from one end, but also provides the first and second shoulders 56, 58 therein as previously described.

Figure 5:
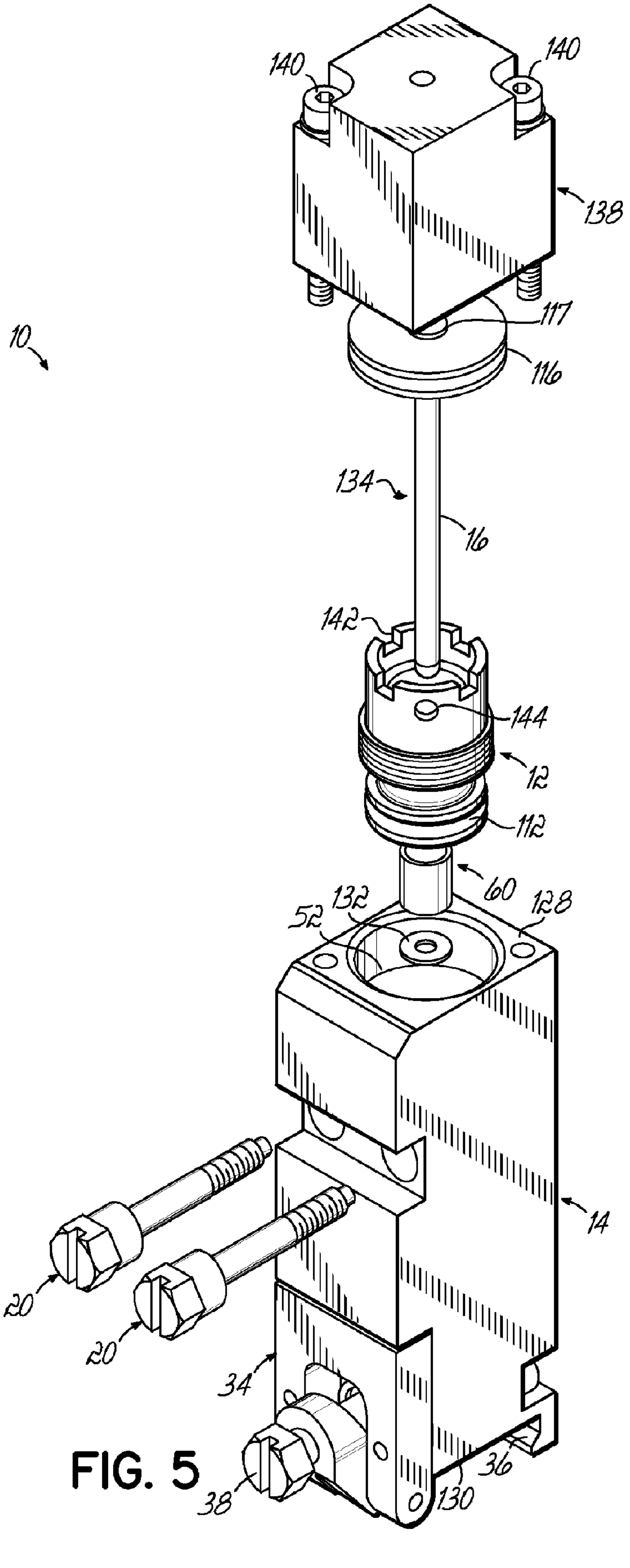
FIG. 5 illustrates an exploded view of the components of the dispensing device of FIG. 2 incorporating the seal assembly of FIG. 3A.

As shown in FIG. 5, to assemble device 10, the valve seat 60 is inserted into the central passage 52 from the proximal end 128. A glass impregnated PTFE disc seal 132 may be inserted with valve seat 60 to provide a seal between the valve seat 60 and dispenser body 14. The valve seat 60 is press fit within second passage portion **52*b* and engages second shoulder 58. The assembled seal assembly 12, as described above, is then inserted into central passage 52 and removably coupled to dispenser body 14 within first passage portion 52*a* by threads 106, 108. The seal assembly 12 is threaded into first passage portion 52*a* until the distal end 70 of housing 66 engages first shoulder 56. When so positioned, the second seal member 76 in distal end 70 of housing 66 is juxtaposed between the second shoulder 86 of housing 66 and first shoulder 56 of dispenser body 14. In this way, second seal member 76 is prevented from moving during the reciprocating motion of valve stem 16**.

The piston 116, assembled as previously described, is then coupled to valve stem 16 to form valve stem assembly 134. The piston 116 may be coupled to valve stem 16 by screw 117. A piston cap 138 is then coupled to the proximal end 128 of the dispenser body 14, such as by fasteners 140, to close off central passage 52. Piston cap 138 includes spring 126 and is configured so that spring 126 acts on a top surface of piston 116 to bias the piston 116 in a downward direction when coupled to dispenser body 14. The assembled device 10 may then be mounted to manifold 18 by mounting fasteners 20.

In an advantageous aspect of the invention, the pre-assembled unitary seal assembly 12 allows for quick and convenient replacement of the dynamic seals within dispenser body 14. To this end, device 10 may be removed from manifold 18 by removing mounting fasteners 20. The piston cap 138 is then removed by removing fasteners 140. Next, the valve stem assembly 134 is removed from the central passage 52. The seal assembly 12 may then be removed from central passage 52. To facilitate the insertion and removal of seal assembly 12, the proximal end 68 of housing 66 may include a tool engaging portion, such as by including one or more notches 142. In this way, a tool (not shown) having a shape complementary to the shape of the proximal end 68 may be used to rotate housing 66 so as to thread seal assembly 12 into/from dispenser body 14. The proximal portion 78 of housing 66 may further include one or more apertures 144 that provide a gripping point for a tool (not shown) for overcoming the friction between O-ring 112 and central passage 52 when removing seal assembly 12 from the central passage 52.

A new seal assembly 12 may then be inserted back into central passage 52 and threaded into place so that housing 66 engages first shoulder 56. The valve stem assembly 134 may then be inserted into central passage 52 and through the housing 66. The piston cap 138 is then replaced and secured by fasteners 140. The device 10, having the replaced seal assembly 12 may then be mounted back onto manifold 18 using mounting fasteners 20. The production line may then be restarted. The unitary aspect of the seal assembly 12 reduces the number of separate components used during seal replacement, reduces the amount of down time to replace the seals, thereby reducing the overall manufacturing costs. Additionally, by replacing the device seals through a factory, pre-assembled seal assembly, as opposed to replacing individual seals on location, increases the reliability and consistency of the seal replacement process.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A device for dispensing a viscous liquid, comprising:

a dispenser body having a liquid passage and an air passage, said liquid passage including a liquid inlet for receiving the liquid and a discharge outlet for dispensing the liquid, said liquid inlet and said discharge outlet in fluid communication with said liquid passage, said air passage including an air inlet in fluid communication with said air passage for supplying pressurized air;

a valve stem mounted within said dispenser body and adapted to move relative to said dispenser body between an open position allowing liquid flow from said discharge outlet and a closed position preventing liquid flow from said discharge outlet; and a pre-assembled, unitary seal assembly positioned within said dispenser body between said liquid passage and said air passage, said seal assembly comprising:

a housing having an outer surface with threads removably coupling said housing with said dispenser body, said housing having a proximal end, a distal end, and a bore extending from said proximal end to said distal end, said bore receiving a portion of said valve stem;

a first seal member positioned within a first portion of said bore and forming a dynamic seal with said valve stem, thereby preventing air from leaking out of said air passage;

a second seal member positioned within a second portion of said bore and forming a dynamic seal with said valve stem, thereby preventing liquid from leaking out of said liquid passage; and a static seal between said housing and said dispenser body for preventing liquid from leaking out of said liquid passage.

2. The device of claim 1, wherein said first seal member includes a plurality of disc seals each having a central aperture receiving a portion of said valve stem.

3. The device of claim 1, wherein said second seal member is a lip seal having a central aperture receiving a portion of said valve stem, said lip seal having an edge portion that bears against said valve stem.

4. The device of claim 1, wherein said static seal further comprises an O-ring carried by said housing.

5. The device of claim 1, wherein said housing further comprises:

a tool engaging portion adjacent said proximal end of said housing and adapted to receive a tool for threadably inserting or removing said seal assembly from said dispenser body.

6. A pre-assembled unitary seal assembly for a device dispensing a viscous liquid, the device including a dispenser body having a liquid passage, an air passage, and a valve stem mounted within the dispenser body and movable relative to the dispenser body for selectively dispensing liquid from the device, comprising:

a housing having a threaded element adapted to removably couple said housing with the dispenser body, said housing having a proximal end, a distal end, and a bore extending from said proximal end to said distal end, said bore adapted to receive a portion of the valve stem;

a first seal member positioned within a first portion of said bore and adapted to form a dynamic seal with the valve stem, thereby preventing air from leaking out of the air passage;

a second seal member positioned within a second portion of said bore and adapted to form a dynamic seal with the valve stem, thereby preventing liquid from leaking out of the liquid passage; and a static seal between said housing and said dispenser body for preventing liquid from leaking out of said liquid passage.

7. The seal assembly of claim 6, wherein said first seal member includes a plurality of disc seals each having a central aperture adapted to receive a portion of the valve stem.

8. The seal assembly of claim 7, wherein said second seal member is a lip seal having a central aperture adapted to receive a portion of the valve stem.

9. The seal assembly of claim 6, wherein said static seal further comprises an O-ring carried by said housing.

10. The seal assembly of claim 6, wherein said housing further comprises:

a tool engaging portion adjacent said proximal end of said housing and adapted to receive a tool for threadably inserting or removing said seal assembly from the dispenser body.

* * * * *